US006826486B1

(12) United States Patent  
Malinverno

(10) Patent No.: US 6,826,486 B1
(45) Date of Patent: Nov. 30, 2004

(54) METHODS AND APPARATUS FOR PREDICTING PORE AND FRACTURE PRESSURES OF A SUBSURFACE FORMATION

(75) Inventor: Alberto Malinverno, Blauvelt, NY (US)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

(21) Appl. No.: 10/406,722

(22) Filed: Apr. 3, 2003

Related U.S. Application Data

(63) Continuation-in-part of application No. 09/502,920, filed on Feb. 11, 2000, now Pat. No. 6,549,854.

(51) Int. Cl.$^7$ .................................................. G01V 1/30

(52) U.S. Cl. ............................. 702/16; 702/9; 367/73

(58) Field of Search .......................... 700/97–98; 702/5, 702/6, 11, 9, 16, 1; 367/73; 175/45, 50

(56) References Cited

U.S. PATENT DOCUMENTS

| | | | | |
|---|---|---|---|---|
| 5,103,920 A | * | 4/1992 | Patton ........................... | 175/45 |
| 5,343,440 A | * | 8/1994 | Kan et al. ...................... | 367/27 |
| 5,539,704 A | * | 7/1996 | Doyen et al. .................. | 367/73 |
| 5,615,115 A | * | 3/1997 | Shilling ......................... | 702/9 |
| 5,838,634 A | * | 11/1998 | Jones et al. .................... | 367/73 |
| 5,889,729 A | * | 3/1999 | Frenkel et al. ................. | 367/73 |
| 6,109,368 A | * | 8/2000 | Goldman et al. .............. | 175/39 |
| 6,278,948 B1 | * | 8/2001 | Jorgensen et al. ............. | 702/6 |
| 6,473,696 B1 | * | 10/2002 | Onyia et al. ................... | 702/6 |
| 6,480,790 B1 | * | 11/2002 | Calvert et al. ................. | 702/14 |
| 6,502,037 B1 | * | 12/2002 | Jorgensen et al. ............ | 702/14 |
| 2002/0120401 A1 | * | 8/2002 | Macdonald et al. ........... | 702/6 |

FOREIGN PATENT DOCUMENTS

| | | | | |
|---|---|---|---|---|
| GB | 2 354 852 | | 4/2001 | ........... E21B/49/00 |
| WO | WO 00/48022 | | 8/2000 | ........... G01V/11/00 |

OTHER PUBLICATIONS

Bourgoyne, A. T., Jr. et al. "Applied Drilling Engineering", *SPE Textbook Series*, vol. 2, (1991), pp. 292–294 and pp. 330–331.

Bowers, G. L. "Pore Pressure Estimation from Velocity Data: Accounting for Overpressure Mechanisms Besides Undercompaction,". *SPE Drilling & Completion* (Jun. 1995), pp. 89–95.

(List continued on next page.)

Primary Examiner—Leo Picard
Assistant Examiner—Alexander J Kosowski
(74) Attorney, Agent, or Firm—David P. Gordon; William B. Batzer; John J. Ryberg

(57) ABSTRACT

A method of predicting values of formation parameters (e.g., compressional velocity, density, pore pressure, and fracture pressure) as a function of depth includes generating an initial prediction of a profile of the formation parameters and uncertainties associated therewith using information available regarding the formation, obtaining information related to the formation parameters during drilling, and updating the uncertainties as a function of the first prediction and the information obtained in a recursive fashion. Known equations are used for finding initial values, and uncertainties associated therewith are quantified by using probability density functions (PDFs). A Bayesian approach is utilized where "prior PDFs" describe uncertainty prior to obtaining additional information, and "posterior PDFs" account for the additional information acquired. As additional information is acquired while drilling, the posterior PDFs are redefined. Uncertainty in the formation parameters is quantified by sampling posterior PDFs given all the data with a Markov Chain Monte Carlo algorithm which generates numerous formation parameter profiles consistent with the data and the computed Bayesian uncertainties. Histograms of the numerous formation parameter profiles may be plotted to visualize the uncertainty in the formation parameters.

40 Claims, 6 Drawing Sheets

OTHER PUBLICATIONS

Eaton, B. A. "Fracture Gradient Prediction and its Application in Oilfield Operations". *Journal of Petroleum Technology* (Oct. 1969), pp. 1353–1360.

Eaton, B. A. "The Equation for Geopressure Prediction from Well Logs". *SPE 50th Annual Fall Meeting*, SPE Paper 3544 (Sep.–Oct. 1975), pp. 1–11.

Esmersoy, C. et al. "Seismic Measurement While Drilling: Conventional Borehole Seismics on LWD". *SPWLA 2001 Annual Symposium*, Paper RR (Jun. 2001), pp. 1–10.

Gardner, G. H. F. et al. "Formation Velocity and Density: The Diagnositc Basis for Stratigraphic Traps". *Geophysics*, vol. 39 (1974), pp. 770–780.

Gilks, W. R. et al. "Markov Chain Monte Carlo in Practice". *Chapman and Hall* (1996).

Hubbert, M. K. et al. "Mechanics of Hydraulic Fracturing". *AIME Trans.*, 210 , (1975), pp. 153–166.

Liang, Q. J. "Application of Quantitative Risk Analysis to Pore Pressure and Fracture Gradient Predition". *SPE 77354* (2002), pp. 1–9.

Malinverno, A. et al. "A Monte Carlo Method to Quantify Uncertainty in the Inversion of Zero–Offset VSP Data", *Expanded Abstracts*, 70th Annual International Meeting of the Society of Exploration Geophysicists (2000), pp. 1–4.

Malinverno, A. et al. "Uncertainty Constrained Subsurface Modeling". *U.S. Patent Application* (Feb. 12, 2000), pp. 1–13.

Matthews, W. R. et al. "How to Predict Formation Pressure and Fracture Gradient from Electric and Sonic Logs". *The Oil and Gas Journal* (Feb. 1967), pp. 92–106.

Pennebaker, E. S. "An Engineering Interpretation of Seismic Data". *SPE 43rd Annual Fall Meeting*, SPE Paper 2165 (Sep.–Oct. 1968), pp. 1–296.

Press, W. H. et al. "Numerical Recipes in C: The Art of Scientific Computing". *Cambridge Univ. press*, 2nd Edition, (1992).

Rubinstein, R. Y. "Simulation and the Monte Carlo Method". *John Wiley and Sons* (1981).

Sayers, C. M. et al. "Pore Pressure Prediction from Seismic Tomography", *Offshore Technology Conf.*, Paper OTC 11984 (May 2000), pp. 1–7.

Yoshida, C. et al. "An Investigative Study of Recent Technologies Used for Prediction, Detection and Evaluation of Abnormal Formation Pressure and Fracture Pressure in North and South America". IADC/SPE Asia Pacific Drilling Tech. Conf., Paper IADC/SPE 36381 (Sep. 1996), pp. 131–151.

Zamora, M. "New Method Predicts Gradient Fracture". *Petroleum Engineer International* (Sep. 1989), pp. 38–47.

\* cited by examiner

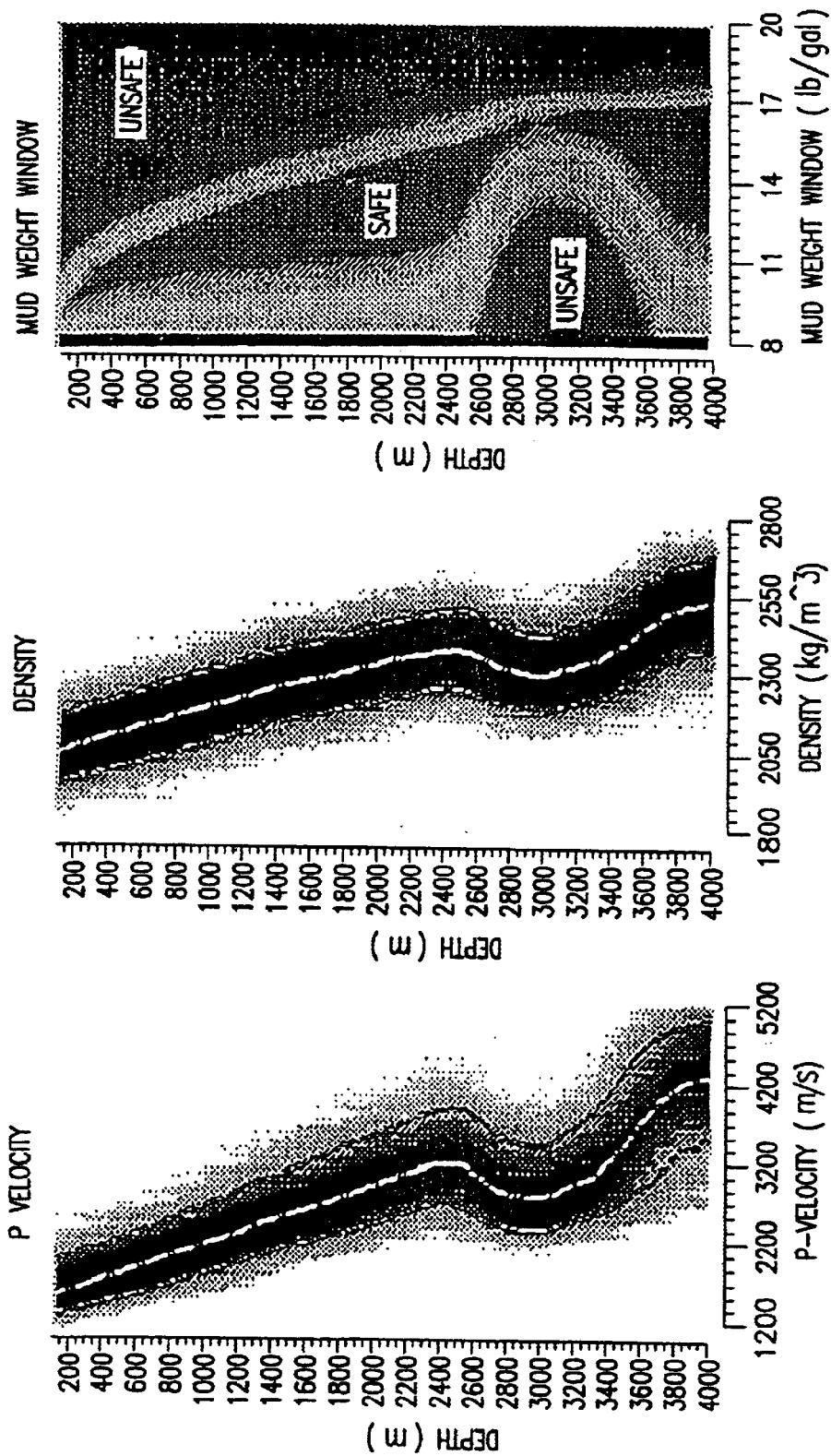

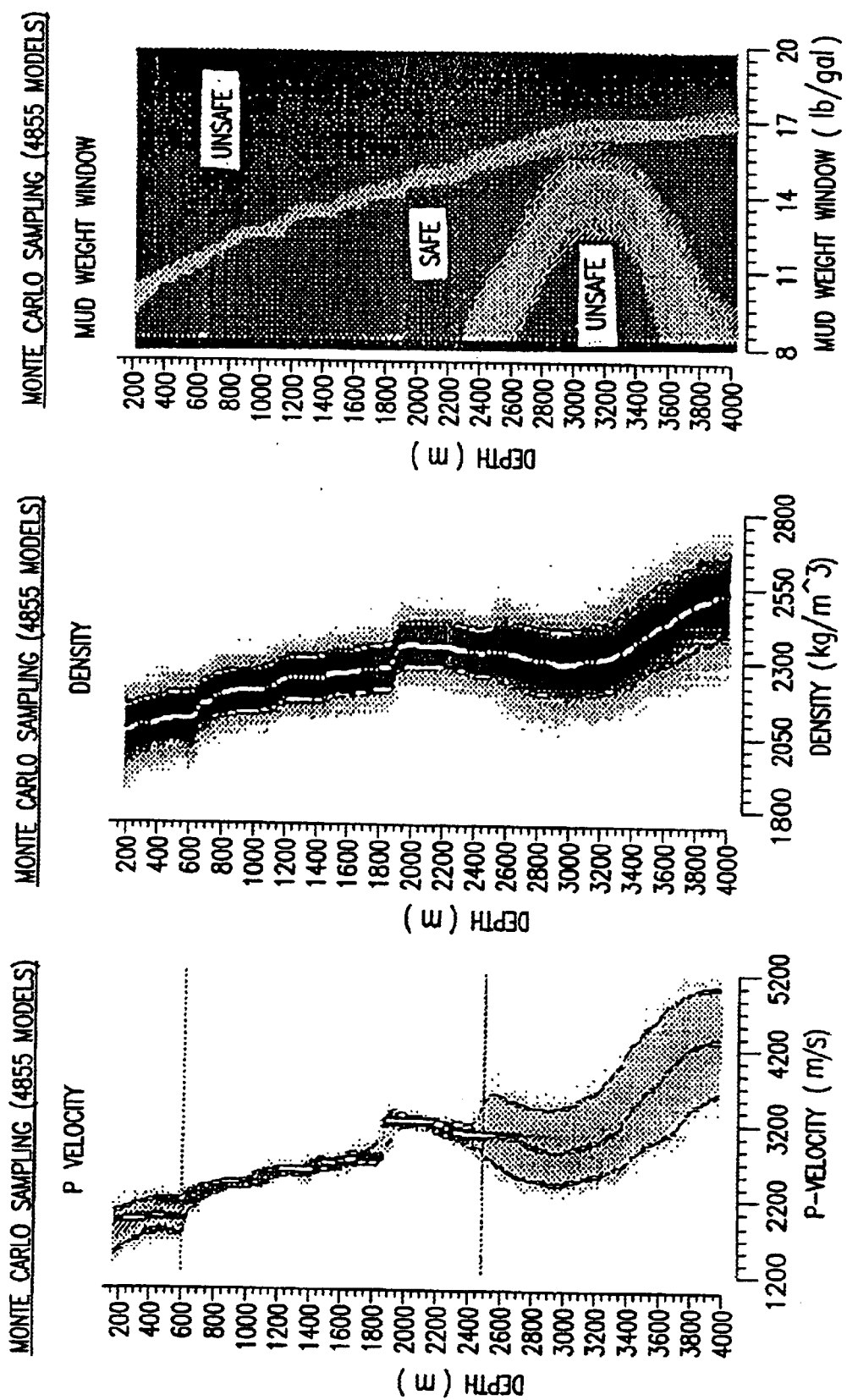

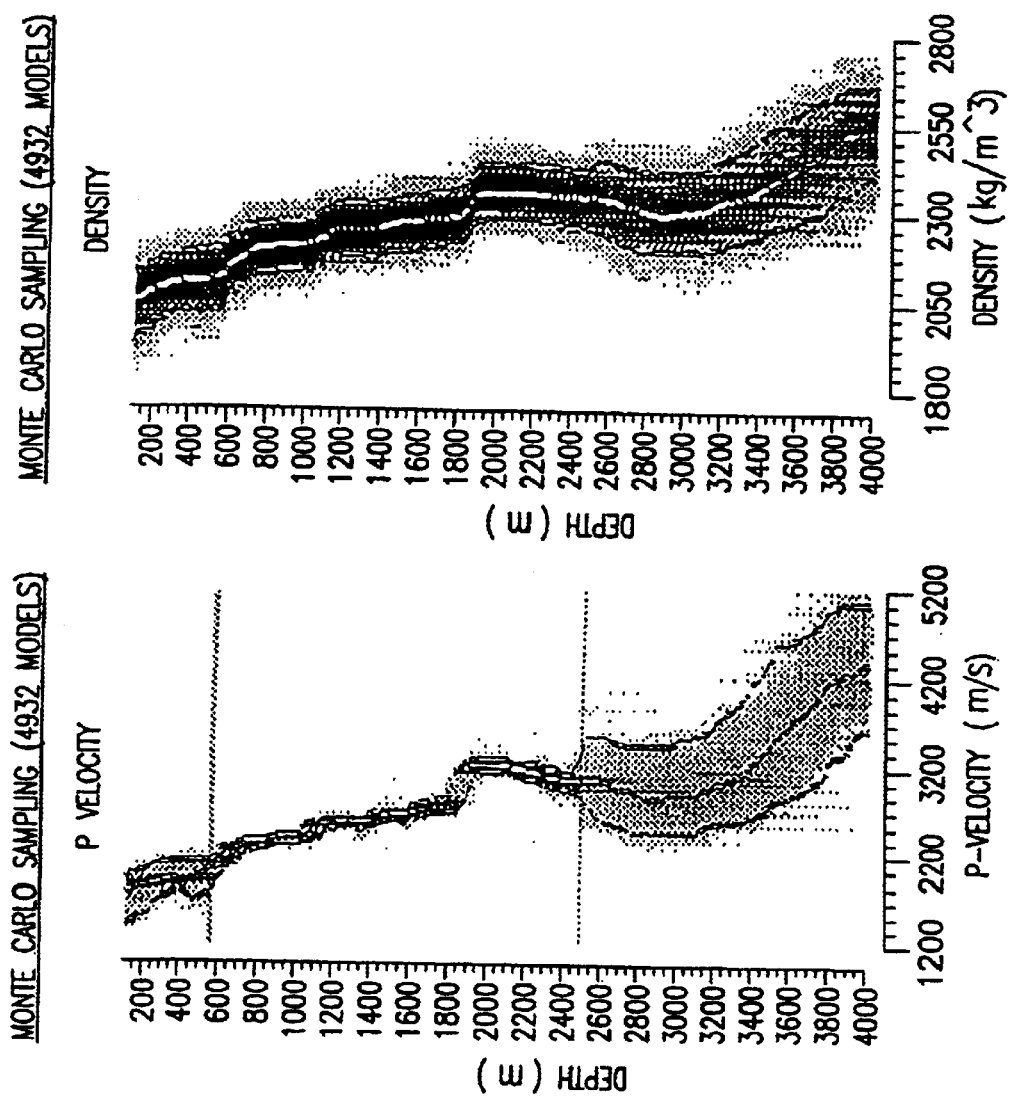

METHODS AND APPARATUS FOR PREDICTING PORE AND FRACTURE PRESSURES OF A SUBSURFACE FORMATION

This is a continuation-in-part of co-owned U.S. patent application Ser. No. 09/502,920, entitled "Uncertainty Constrained Subsurface Modeling", filed Feb. 11, 2000 now U.S. Pat. No. 6,549,854 and hereby incorporated by reference herein in its entirety.

BACKGROUND OF THE INVENTION

1. Field of the Invention

This invention relates broadly to the hydrocarbon industry. More particularly, this invention relates methods and apparatus for predicting pore and fracture pressures of a surface formation. The invention has particular application to the casing of wells undertaken during the drilling of the well, although the application is not limited thereto.

2. State of the Art

To safely drill a deep well for hydrocarbon exploration or production, it is necessary to prevent formation fluids from flowing into the well. This is typically done by adjusting the density of the drilling mud so that the wellbore pressure is at all depths above the pressure of formation fluids (the pore pressure). On the other hand, the mud density cannot be so great as to cause hydraulic fracturing of the formation (the fracture pressure). The pore pressure and the fracture pressure gradients thus provide minimum and maximum values for the mud weight that define a mud weight window (See, Burgoyne, A. T., Jr., Millheim, K. K., Chenevert, M. E., and Young, F. S., Jr., Applied Drilling Engineering, SPE Textbook Series, vol. 2, 1991).

In deep drilling, it is generally not possible to choose a mud weight that keeps the wellbore pressure within the bounds imposed by the pore and fracture pressures over the entire depth range of the well, and it is necessary to set a number of intermediate casing strings to hydraulically isolate the formation. As seen in FIG. 1, these casing strings are set at depths defined on the basis of the estimated pore and fracture pressure gradients. For safe and cost-effective drilling, it is then important to have a method to estimate pore and fracture pressures before drilling and to update these estimates as the well is being drilled and new information is acquired.

In current practice, estimates of the pore and fracture pressures can be obtained from information on the variation in compressional wave velocity with depth (in turn obtained from surface seismic data and borehole measurements). These estimates can then be calibrated with pressure data acquired during drilling. Although these pore and fracture pressure estimates are recognized to be inaccurate, a major limitation of current practice is that there is no quantification of their uncertainty.

An approach commonly used to estimate pore and fracture pressures is based on measurements of compressional wave velocities, formation resitivities, or drilling penetration rates. The fundamental assumption of this approach is that anomalies over a normal trend in depth of these measurements are related to corresponding anomalies in pore and fracture pressures. For example, if elevated pore pressures are due to undercompaction of shales, the sediment porosities will be anomalously high and velocities anomalously low. For purposes of simplicity, the description of the invention herein will focus on the use of compressional wave velocity to estimate pore and fracture pressures, because velocity estimates are typically available before drilling from the processing of surface seismic data (see, e.g., Sayers, C. M., Johnson, G. M., and Denyer, G., "Pore pressure prediction from seismic tomography", paper OTC 11984 presented at the 2000 Offshore Technology Conference, Houston, May 14, 2000) and can then be refined with measurements acquired while drilling such as sonic logs, vertical seismic profiles (VSPs), or seismic MWD (see, e.g., Esmersoy, C., Underhill, W., and Hawthorn, A., "Seismic measurement while drilling: conventional borehole seismics on LWD", paper RR presented at the 2001 Annual Symposium of the Society of Professional Well Log Analysts, Houston, Jun. 17–20, 2001).

Most methods for pore and fracture pressure prediction start from Terzaghi's effective stress principle, which states that all effects of stress on measurable quantities (such as compressional wave velocities) are a function of the effective stress $\sigma_v(z)$, defined as $$\sigma_v(z) = p_{over}(z) - p_{pore}(z), \tag{1}$$

where $p_{pore}(z)$ is the pore pressure at depth z, and $p_{over}(z)$ is the pressure due to the overburden. The pressure due to the overburden $p_{over}(z)$ is defined by $$p_{over}(z) = g \int \rho(z') dz', \tag{2}$$

where g is the acceleration of gravity, $\rho(z)$ is bulk density, and the integration is carried out from the surface to depth z. A commonly used formula to predict pore pressure is set forth in Eaton, B. A., "The equation for geopressure prediction from well logs", paper SPE 5544 presented at the 50$^{th}$ annual fall meeting of the Society of Petroleum Engineers, Dallas, Sept. 28–Oct. 1, 1975:

$$p_{pore}(z) = p_{over}(z) - [p_{over}(z) - p_{norm}(z)][\alpha(z)/\alpha_{norm}(z)]^n, \tag{3}$$

where $p_{norm}(Z) = p_w g z$ is the normal (hydrostatic) pore pressure ($p_w$ is the water density), $\alpha(z)$ the compressional wave velocity, and $\alpha_{norm}(z)$ the normal trend expected when there are no overpressures. As set forth in Sayers, C. M., Johnson, G. M., and Denyer, G., "Pore pressure prediction from seismic tomography", paper OTC 11984 presented at the 2000 Offshore Technology Conference, Houston, May 1–4, 2000, this normal trend can be taken to be a linear increase in velocity with depth:

$$\alpha_{norm}(z) = \alpha_0 + b_\alpha [z - z_0] \tag{4}$$

where $\alpha_0$ is the velocity at the mudline, $b_\alpha$ the velocity gradient in the normal trend, and $z_0$ the depth of the mudline.

Eaton's equation (3) essentially predicts that where the compressional wave velocity follows the normal trend, the pore pressure should be close to its normal, hydrostatic value. If the velocity becomes smaller than the normal trend, the pore pressure predicted by equation (3) increases from the hydrostatic value. To apply this method to any particular location, one should determine the variation of velocity and density in depth, the value of the coefficients as and $b_\alpha$ in the normal velocity trend, and the value of the exponent n in equation (3). Compressional wave velocity can be estimated from surface seismic data. Density can be estimated from a local trend (e.g., established from logs in nearby wells) or from a relationship between velocity and density such as Gardner's law (see, Gardner, G. H. F., Gardner, L. W., and Gregory, A. R., "Formation velocity and density: The diagnostic basis for stratigraphic traps", Geophysics, 39, p. 770–780, 1974):

$$\rho(z) = A \, \alpha(z)^\beta. \tag{5}$$

The coefficients A and B in (5) can be obtained by fitting Gardner's law in a cross-plot of logged values of compressional velocity and density; an example of which is shown in FIG. 2. Of course, the value of density cannot be exactly predicted by compressional velocity with Gardner's law as the density predicted from velocity using Gardner's law will have a residual uncertainty which is denoted by $\Delta_p$ and is typically a few percent of the density value.

The coefficients $\alpha_0$ and $b_\alpha$ in the normal velocity trend can be estimated from the velocity trend at depth intervals known or assumed to be in normal pressure conditions. Eaton originally suggested that the exponent n should be around 3. In Bowers, G. L., "Pore pressure estimation from velocity data: Accounting for overpressure mechanisms besides undercompaction", SPE Drilling & Completion, p. 89–95, June 1995 (1995), however, it was noted that if overpressures are due to mechanisms other than undercompaction the appropriate value of n should be higher (up to about 5). The coefficients $\alpha_0$ and $b_\alpha$ and the exponent n can be calibrated by measurements of pore pressure or mud weights in the well being drilled (see, e.g., Bowers, 1995, and see Sayers et al., 2000, both cited above).

Widely used methods for fracture pressure predictions also start from Terzaghi's effective stress principle (equation 1 above). The most common stress state is one where the minimum effective stress $\sigma_h(z)$ is horizontal, and can be written as a function of the vertical effective stress:

$$\sigma_h(z) = k(z)\sigma_v(z), \qquad (6)$$

where $k(z) \leq 1$ is a dimensionless effective stress ratio. As originally proposed by Hubbert, M. K., and Willis, D. G., "Mechanics of hydraulic fracturing", Trans. AIME, 210, p. 153–166, (1957), hydraulic fracturing should occur when the wellbore pressure is greater than the minimum horizontal effective stress, so the fracturing pressure $p_{frac}(Z)$ can be written as $$p_{frac}(z) = p_{pore}(z) + k(z)[p_{over}(z) - p_{pore}(z)]. \qquad (7)$$

Hubbert and Willis originally proposed a constant value of ⅓ for the effective stress ratio, but subsequently others recognized that the effective stress ratio increases with depth (Matthews, W. R., and Kelly, J., "How to predict formation pressure and fracture gradient from electric and sonic logs", The Oil and Gas Journal, Feb. 20, 1967, p. 92–106; Pennebaker, E. S., "An engineering interpretation of seismic data", paper SPE 2165 presented at the 43rd annual fall meeting of the Society of Petroleum Engineers, Houston, Sep. 29–Oct. 2, 1968; Eaton, B. A., "Fracture gradient prediction and its application in oilfield operations", Journal of Petroleum Technology, October 1969, p. 1353–1360). Published plots of the variation of the effective stress ratio k(z) with depth are well represented by an exponential function (e.g., Zamora, M., "New method predicts gradient fracture", Petroleum Engineer International, Sept. 1989, p. 3847, 1989); a relationship for k(z) is best written (following Terzaghi's effective stress principle) as a function of the vertical effective stress:

$$k(z) = k_\infty - [k_\infty - k_0]\exp\{-[p_{over}(z) - p_{pore}(z)]/b_k\} \qquad (8)$$

where $k_0$ is the value of the effective stress ratio at the mudline and $b_k$ a decay constant controlling how quickly k(z) increases with increasing vertical effective stress, approaching an asymptotic value of $k_\infty$ as depth goes to infinity.

To apply this method to any particular location, one needs to determine the variation of overburden and pore pressure with depth and the coefficients needed to determine the variation of the effective stress ratio with depth. Values of these coefficients in different regions can be found in the published literature (see, e.g., Zamora, M., cited above). These coefficients can be calibrated by measurements of fracture pressures in the well being drilled, typically done in leak-off tests taken after setting a casing string (Burgoyne, A. T., Jr., Millheim, K. K., Chenevert, M. E., and Young, F. S., Jr., "Applied Drilling Engineering", SPE Textbook Series, vol. 2, 1991).

The pore and fracture pressure relationships (equations 3 and 7) can be used to make a deterministic prediction; i.e., a single prediction of both the pore pressure and the fracture pressure based on the most likely values of all inputs. The fundamental inputs to equations (3) and (7) are:

Compressional wave velocity in depth at the drilling location $\alpha(z)$, which can be determined from measurements related to compressional wave velocities, such as surface seismics, vertical seismic profiles, seismic MWD (see, e.g., Esmersoy, C., Underhill, W., and Hawthorn, A., "Seismic measurement while drilling: conventional borehole seismics on LWD", paper RR presented at the 2001 Annual Symposium of the Society of Professional Well Log Analysts, Houston, Jun. 17–20, 2001), and wireline or LWD sonic log data;

Bulk density in depth at the drilling location $\rho(z)$, which can be determined from a local trend in the variation of density with depth, a relationship between the compressional wave velocity and density such as Gardner's law, and wireline or LWD density log data;

Coefficients needed in the pore pressure relationship, which can be written as a vector $c_{pore} = (\alpha_0, b_\alpha, n)$ and can be determined from measurements related to pore pressures, such as direct measurements of pore pressures and mud weights;

Coefficients needed in the fracture pressure relationship, which can be written as a vector $c_{frac} = (k_\infty, k_0, b_k)$, and can be determined from measurements related to fracture pressures, such as direct measurements of fracture pressures carried out during leak-off tests.

Given the inputs above, a deterministic prediction of the pore and fracture pressures can be computed by: constructing a best estimate of compressional wave velocity in depth $\alpha(z)$; constructing a best estimate of density in depth $\rho(z)$; computing an overburden pressure profile $p_{over}(z)$ by integrating the density profile $\rho(z)$; computing pore pressure $p_{pore}(z)$ from equation (3) using $p_{over}(z)$, the velocity profile $\alpha(z)$, and coefficients in $c_{pore}$; and computing fracture pressure $p_{frac}(z)$ from equation (7) using $p_{pore}(z)$, $p_{over}(z)$, and coefficients in $c_{frac}$. By using most likely values for the velocity $\alpha(z)$ and coefficients $c_{pore}$ and $c_{frac}$, the final result will be a best estimate for each of the profiles $p_{pore}(z)$ and $p_{frac}(z)$.

This method of estimating pore and fracture pressures is primarily applicable if certain assumptions are met; for example, that anomalous pore pressures are due to undercompaction and that the volume being drilled is not under horizontal compression. Even when these assumptions are valid, however, a straightforward application is problematic, because the necessary inputs to equations (3) and (7) are not generally known accurately.

SUMMARY OF THE INVENTION

It is therefore an object of the invention to provide methods and apparatus for the prediction of formation parameters.

It is another object of the invention to provide methods and apparatus for the prediction of formation parameters which utilizes all information available for such prediction at the time of the prediction.

It is a further object of the invention to provide methods and apparatus for the prediction of formation parameters which takes into account the accuracy of all data available for use in such prediction at the time of the prediction.

It is an additional object of the invention to provide methods and apparatus for the prediction of formation parameters which also provide measures of uncertainty associated with the prediction.

Another object of the invention is to provide methods and apparatus for the prediction of pore and fracture pressures in an earth formation;

A further object of the invention is to provide methods and apparatus for the prediction of pore and fracture pressures in an earth formation which utilizes information obtained while drilling a borehole.

An additional object of the invention is to provide methods and apparatus for the prediction of pore and fracture pressures in an earth formation which utilizes all information available at the time of prediction, takes into account the accuracy of the information, and provides a measure of uncertainty associated with the prediction.

In accord with the objects of the invention which will be discussed in more detail below, a method of predicting values of formation parameters as a function of depth from a formation surface is provided and includes: generating an initial prediction of a profile of the formation parameters and uncertainties associated with the initial prediction using information available regarding the formation; and obtaining information related to the formation parameters during drilling of the formation and updating the uncertainties as a function of the first prediction and the information obtained in a recursive fashion. At any point in the drilling, the initial prediction and updated uncertainties may be used to generate numerous formation parameter profiles consistent with the data and uncertainties which are plotted to provide a probabilistic representation of the formation parameters.

In a preferred embodiment of the invention, known equations are used for finding initial values for formation parameters such as compressional velocity and density (which may be used to calculate pore pressure and fracture pressure). The uncertainties associated with the initial values are preferably quantified by using probability density functions (PDFs). To determine these PDFs, a Bayesian approach is utilized where "prior PDFs" describe uncertainty prior to obtaining additional information, and "posterior PDFs" account for the additional information acquired. As additional information is acquired, the posterior PDFs are redefined to include the new information. According to a preferred aspect of the invention, uncertainty in the formation parameters is quantified by sampling their posterior PDFs given all the data with a Markov Chain Monte Carlo algorithm which generates numerous formation parameter profiles consistent with the data and the computed Bayesian uncertainties. The numerous formation parameter profiles may then be plotted to provide a probabilistic representation (e.g., a histogram) of the formation parameters.

Additional objects and advantages of the invention will become apparent to those skilled in the art upon reference to the detailed description taken in conjunction with the provided figures.

BRIEF DESCRIPTION OF THE DRAWINGS

FIGS. 4a–c are plots showing uncertainty in compressional wave velocity, density, and mud weight respectively over depths in a well prior to drilling.

FIGS. 5a–5c are plots showing uncertainty in compressional wave velocity, density, and mud weight respectively over depths in the well after using check-shot data collected while drilling.

FIGS. 6a–6c are plots showing uncertainty in compressional wave velocity, density, and mud weight respectively over depths in the first well after using check-shot data collected while drilling as well as well pressure data collected while drilling.

DETAILED DESCRIPTION OF THE PREFERRED EMBODIMENTS

Figure 1:
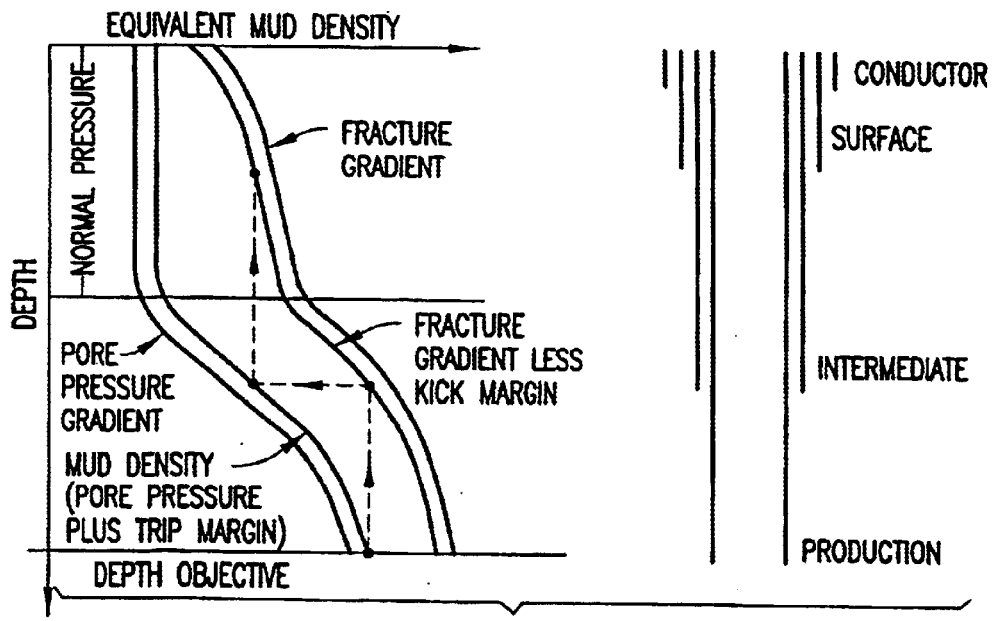
FIG. 1 is a diagram showing pore pressure gradient and fracture gradient curves and a casing plan based on those curves.
Figure 3:
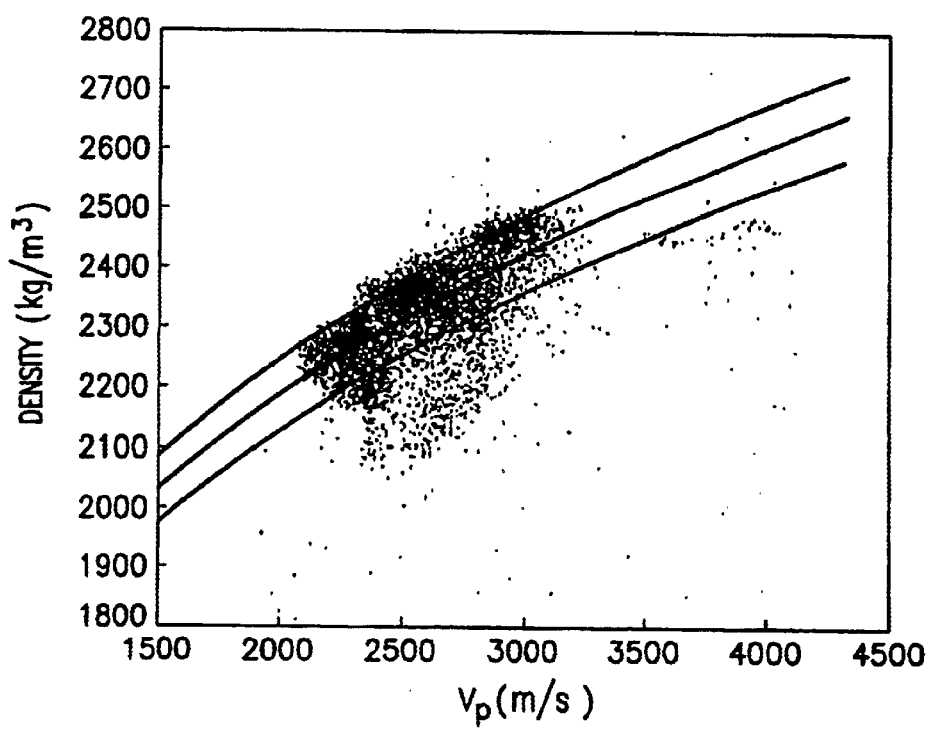
FIG. 3 is a flow chart of several steps associated with the method, apparatus and article of manufacture and provides a general overview of the invention.

Turning to FIG. 3, a flow chart is seen of several steps associated with the method, apparatus and article of manufacture of the invention. The invention is particularly described with reference to predicting pore and fracture pressure profiles in order to generate a mud weight window for purposes of making decisions regarding the casing of a well. Broadly stated, the invention involves obtaining at 10 data relating to the earth formation in which a well is to be drilled. The data preferably includes compressional wave velocity information (such as might be obtained by surface seismic surveys), and other data such as in the form of well logs which may have been obtained from other wellbores nearby the proposed well and which might provide formation density information. Using techniques and equations (such as the equations set forth in the Background hereto) known in the art, at 12, the seismic and other data is used to generate initial profiles (i.e., indications over depth) of compressional wave velocity, density, pore pressures and fracture pressures in the formation. In addition, the seismic and other data is used to generate a determination of the uncertainty associated with the generated profiles. According to the invention, using the initial profiles and the initial uncertainties as inputs to a Monte Carlo type algorithm, a large number N (e.g., hundreds or thousands or more) of predicted pore and fracture pressure profiles (and, if desired, density and compressional velocity profiles) are produced that are consistent with all the available data and prior knowledge of the uncertainties. The large number of predicted pore and fracture pressure profiles (and, if desired compressional velocity and density profiles) are optionally displayed at 15 as histograms which empirically show uncertainties or probabilities. Preferably using the initial profiles and uncertainties associated therewith, an appropriate mud density is chosen at 16, and drilling begins at 18. As drilling progresses, additional data is obtained by the drilling equipment at 20 using known techniques. For example, checkshot data may be acquired while drilling using seismic MWD techniques. Likewise, well pressure data may be obtained while drilling using LWD techniques. At any point in time (e.g., after a certain number of data points are received, or after a certain amount of time has transpired, and/or after each trip out of the well), this additional data is used at 22 to update the profiles and their associated uncertainties. In particular, a Bayesian approach is preferably utilized where the initial estimates and uncertainties are used to define prior probability density functions or "prior PDFs", while the additional data (with its related uncertainties) are used in generating "posterior PDFs" which account for the additional information acquired. At 24, the updated profiles and associated uncertainties are used as inputs into a Markov Chain Monte Carlo algorithm which generates a large number (N) formation parameter profiles consistent with the data and the computed Bayesian uncertainties. The numerous formation parameter profiles may then be plotted at 26 to provide a probabilistic representation (e.g., as histogramns which empirically show uncertainties or probabilities) of the formation parameters. According to the invention, steps 20–26 are repeated as desired as drilling continues. The information obtained from the histograms (i.e., the pore pressure gradient and fracture gradient) is preferably used from time to time at 28 in decisions regarding the casing of the well and the mud weights to be used during drilling.

As set forth above, the invention is particularly described with reference to predicting pore and fracture pressure profiles. Thus, at step 24, and as will be described in more detail hereinafter, a large number N of predicted pore and fracture pressure profiles are produced that are consistent with all the available data and prior knowledge of the uncertainties in the inputs to equations (3) and (7) described above. These N profiles will span the range of pore and fracture pressures consistent with the available information and thus will quantify the uncertainty of a predicted mud weight window. This approach therefore addresses uncertainties in the inputs to equations (3) and (7). It should be stressed, however, that those equations are still assumed to be valid; in other words, the method does not address uncertainties in the form of the pore and fracture pressure relationships expressed in equations (3) and (7). Uncertainties in the measurements are quantified in the inputs to equations (3) and (7), and in the predicted pore and fracture pressures using probability density functions, or PDFs. To determine these PDFs, a widely used Bayesian approach is adopted (see, e.g., co-owned U.S. Ser. No. 09/502,920 previously incorporated by reference herein). As previously suggested, using the Bayesian approach, the "prior PDFs" are used to describe uncertainty before drilling and the "posterior PDFs" account for measurements acquired during drilling. As additional measurements become available during drilling (at step 20), the posterior PDFs are redefined (at step 22) to include the new information and provide an improved prediction of pore and fracture pressures. The posterior PDFs of the pore and fracture pressures will give the best predictions and their uncertainties at any given time.

At this point it is useful to list the inputs to equations (3) and (7) which will be treated as uncertain and the measurements that are preferably used. The inputs that will be treated as uncertain are:

$\alpha(z)$ and $\rho(z)$: Profiles of compressional wave velocity and density;

$c_{pore}$: A vector of coefficients that enter the pore pressure relationship (equation 3);

$c_{frac}$: A vector of coefficients that enter the fracture pressure relationship (equation 7). The measurements are $d_\alpha$: A vector of data related to compressional wave velocities such as checkshot data (depth-travel time pairs) obtained by wireline or seismic MWD, sonic log data, VSP data;

$d_p$: A vector of data related to density, such as density log data;

$d_{pore}$: A vector of data related to pore pressure, such as mud weights or direct measurements of pore pressure (e.g., typically obtained by the RFT tool or MDT tool of Schlumberger; RFT and MDT being trademarks of Schlumberger);

$d_{frac}$: A vector of data related to fracture pressure, such as pressure measurements obtained during leak-off tests.

The fundamental PDF of interest is the posterior PDF of the uncertain inputs conditional on all the data and the known coefficients, which can be formally written using the definition of a conditional PDF as $$f(\alpha(z), \rho(z), c_{pore}, c_{frac} | d_\alpha, d_\rho, d_{pore}, d_{frac}) = \qquad (9)$$
$$f(\alpha(z) | d_\alpha, d_\rho, d_{pore}, d_{frac}) \times f\rho(z) | (\alpha(z), | d_\alpha, d_\rho, d_{pore}, d_{frac}) \times$$
$$f(c_{pore}|\alpha(z), \rho(z), d_\alpha, d_\rho, d_{pore}, d_{frac}) \times$$
$$f(c_{frac}|\alpha(z), \rho(z), c_{pore}, d_\alpha, d_\rho, d_{pore}, d_{frac}).$$

This expression can be simplified if each conditional PDF $f(x|y)$ is written as having only the quantities in the given y that are relevant to each uncertain input x, obtaining $$f(\alpha(z), \rho(z), c_{pore}, c_{frac}|d_\alpha, d_\rho, d_{pore}, d_{frac}) = f(\alpha(z)|d_\alpha) \times \qquad (10)$$
$$f(\rho(z)|\alpha(z), d_\rho) \times$$
$$f(c_{pore}|\alpha(z), \rho(z), d_{pore}) \times f(c_{frac}|\alpha(z), \rho(z), c_{pore}, d_{frac}).$$

The four PDFs on the right-hand side of (10) contain data as given and can be written, using Bayes' rule, as the product of a prior PDF and a likelihood function, e.g., $$f(\alpha(z)|d_\alpha) = \text{const.} f(\alpha(z)) f d_\alpha|\alpha(z)), \qquad (11)$$

where the prior PDF $f(\alpha(z))$ is defined on the basis of what is known about $\alpha(z)$ independently of the well data $d_\alpha$. In the present case, the prior PDF should define the uncertainty in the velocity profile from surface seismic data. The likelihood function $f(d_\alpha|\alpha(z))$ measures how probable are the observed well measurements for a given value of $\alpha(z)$. To define the likelihood one needs a way to compute the measurements predicted for any value of $\alpha(z)$ and a measure of the expected errors in the data. If no well measurements $d_\alpha$ were available, the posterior PDF equals the prior PDF.

In accord with the preferred embodiment of the invention, continuous profiles of velocity $\alpha(z)$ and density $\rho(z)$ are represented by a layered model with depths to the interfaces between layers in a vector z and values of velocity and density in vectors $\alpha$ and p. For k layers, there will be k–1 depths in z, k velocities in $\alpha$, and k densities in p. Therefore, any possible layered model is defined by a number of layers k and vectors z, $\alpha$, and p. Below, an algorithm is described which is used to sample first a value $a^*(z)$ from the posterior $f(\alpha(z)|d_\alpha)$, and then a value $\rho^*(z)$ from $f(\rho(z)|\alpha(z), d_p)$. As the ideally continuous velocity and density profiles are represented by a layered model, these two PDFs are written as $|(k, z, \alpha|d_\alpha)$ and $f(p|k, z, \alpha, d_p)$, respectively.

It is convenient to work with compressional wave slowness, the reciprocal of velocity, because the relationship between travel time data and layer slownesses is linear. Thus, velocity is expressed in each layer by a vector u containing k values of slowness. Slownesses are typically dealt with only internally in the sampling and the output is generally given in terms of velocity.

From Bayes' rule, the posterior PDF of slownesses is proportional to the product of a prior PDF and a likelihood function:

$f(k, z, u|d_\alpha) = \text{const.} \; f(k, z, u) f(d_\alpha|k, z, u),$ (12)

and in the following the prior PDF and likelihood function are specified. The prior PDF can immediately be decomposed as $f(k, z, u) = f(k, z) f(u|k, z).$ (13)

The prior PDF $f(k, z)$ for the number of layers k and the depths to the interfaces z is a uniform distribution: any choice of k and z is deemed to be equally likely to any other a priori. The prior PDF of the slownesses in u for a given choice of k and z is a multivariate normal:

$f(u|k, z) = \text{const.} \; exp\{-\frac{1}{2}[u-\mu_u^{prior}]^T [\Sigma_u^{prior}]^{-1} [u-\mu_u^{prior}]\},$ (14)

with a prior mean $\mu_u^{prior}$ and a prior covariance matrix $\Sigma_u^{prior}$. The prior mean and covariance are set on the basis of what is known before drilling, typically from velocity analysis of surface seismic data. In accord with the preferred embodiment of the invention, the user will specify at the outset a best predicted velocity function defined by a few depth-velocity pairs and an uncertainty of this best estimate. The prior mean $\mu_u^{prior}$ is then computed by linearly interpolating the best velocity function and taking the reciprocal; the prior covariance $\Sigma_u^{prior}$ is set to a diagonal matrix with a prior standard deviation equal to the fractional uncertainty of the best estimate of velocity.

The likelihood function $f(d_\alpha|k, z, u)$ for the slownesses in each layer is also a multivariate normal distribution $f(d_\alpha|k, z, u) = $ (15)
$\text{const.} \; exp\{-1/2[d_\alpha - G(k, z)u]^T [\Sigma_\epsilon]^{-1} [d_\alpha - G(k, z)u]\},$ where G(k, z) is a matrix that depends on the number of layers and on the depths of layer interfaces and that, when multiplied by the vector of slownesses u in each layer, gives predicted data; $\Sigma_\epsilon$ is a matrix containing the covariance of the data errors; e.g., a diagonal matrix with standard deviations that need to be specified by the user as expected errors in the measurements.

For a prior PDF as in equation (14) and a likelihood as in equation (15), the posterior PDF of slownesses for a given choice of k layers and of interface depths z is also a multivariate normal distribution:

$f(u|k, z, d_\alpha) = \text{const.} \; exp\{-\frac{1}{2}[u-\mu_u^{post}]^T [\Sigma_u^{post}]^{-1} [u-\mu_u^{post}]\},$ (17)

where the posterior covariance matrix equals $[\Sigma_u^{post}]^{-1} = [\Sigma_u^{prior}]^{-1} + G(k, z)^T [\Sigma_\epsilon]^{-1} G(k, z)$ (18)

and the posterior mean vector equals $\mu_u^{post} = \mu_u^{prior} + \Sigma_u^{post} G(k, z)^T [\Sigma_\epsilon]^{-1} [d_\alpha - G(k, z)\mu_u^{prior}].$ (19)

Another quantity relevant to the sampling is the marginal likelihood, that is, the likelihood of a choice of k and z for all values of the vector of slownesses u. This marginal likelihood is the integral $\int f(u|k, z) f(d_\alpha|k, z, u) \, du$, and can be shown to equal $f(d_\alpha|k, z) = \text{const.} \; \{det[\Sigma_u^{post}] / det[\Sigma_u^{prior}]\}^{1/2} \times$ (20)
$exp\{-1/2[\mu_u^{post} - \mu_u^{prior}]^T [\Sigma_u^{prior}]^{-1} [\mu_u^{post} - \mu_u^{proir}]\} \times$ -continued
$exp\{-1/2[d_\alpha - G(k, z)\mu_u^{post}]^T [\Sigma_\epsilon]^{-1} [d_\alpha - G(k, z)\mu_u^{post}]\}.$ The posterior PDF of the density in each layer $f(\rho|(\rho|k, z, a, d_\rho)$ is also a multivariate normal distribution $f(\rho|k, z, \alpha, d_\rho) = \text{const.} \; exp\{-\frac{1}{2}[\rho-\mu_\rho^{post}]^T [\Sigma_\rho^{post}]^T [\Sigma_\rho^{post}]^{-1} [\rho-\mu_\rho^{post}]\},$ (21)

where the posterior mean $\mu_\rho^{post}$ and a posterior covariance $\Sigma_\rho^{post}$ of the vector of densities ρ are obtained from a combination of a prior PDF and a likelihood function following the same procedure used for the vector of slownesses u. The prior PDF $f(\rho|k, z, \alpha)$ for the density in each layer is a multivariate normal distribution (as in equation (14) for slownesses) with a prior mean $\mu_\rho^{prior}$ and a prior covariance $\Sigma_\rho^{prior}$ that are determined from a local trend and its associated uncertainty or from Gardner's law (equation 5). If Gardner's law is used, the prior mean $\mu_\rho^{prior}$ equals the value of density predicted by the coefficients A and B for the given velocity in α, and the prior covariance $\Sigma_\rho^{prior}$ has variances equal to the square of $\Delta_\rho$ times the mean value of density. The likelihood function $f(d_\rho|k, z, \alpha, \rho)$ for densities is also a multivariate normal distribution as in equation (15), where G(k, z) is a matrix that, when multiplied by the vector of densities ρ in each layer, gives predicted log density data, and $\Sigma_\rho$ is a matrix containing the covariance of the log density data errors. The posterior covariance $\Sigma_\rho^{post}$ and the posterior mean $\mu_\rho^{post}$ of the vector of densities ρ are obtained as done for the vector of slownesses u in equations (18) and (19) respectively, with the appropriate substitutions.

Sampling of the posterior PDF $f(c_{pore}|\alpha(z), \rho(z), d_{pore})$ of the coefficients in the pore pressure equation and the posterior PDF $f(c_{frac}|\alpha(z), \rho(z), c_{pore}, d_{frac})$ of the coefficients in the fracture pressure equation is obtained in a similar manner to the previously described sampling of the posterior PDFs of the velocity and density profiles. Using a layered model, the pore pressure equation and fracture pressure equation posterior PDFs may be written in terms of the parameters of the layered model as $f(c_{pore}|k, z, \alpha, \rho, d_{pore})$ and $f(c_{frac}|k, z, \alpha, \rho, c_{pore}, d_{frac})$. The two posterior PDFs $f(c_{pore}|k, z, \alpha, \rho, d_{pore})$ and $f(c_{frac}|k, z, \alpha, \rho, c_{pore}, d_{frac})$ can be written again from Bayes' rule as proportional to the product of a prior PDF and a likelihood function. The prior PDF for both $c_{pore}$ and $c_{frac}$ is simply a uniform PDF between a minimum and maximum value for each coefficient, and according to the preferred embodiment of the invention, the user will specify these minimum and maximum values at the outset.

To compute the likelihoods $f(d_{pore}|k, z, \alpha, \rho, c_{pore})$ and $f(d_{frac}|k, z, \alpha, \rho, c_{pore}, c_{frac})$, first, the pore and fracture pressures are computed from the velocity and density in the layered model. The pore and fracture pressures are represented in a layered model as vectors of k pressure gradients $g_{pore}$ and $g_{frac}$, which are constant within each homogeneous layer. These pressure gradients are computed by first evaluating the overburden pressure at the depth to the middle of each layer from the density in p; computing the corresponding pore and fracture pressures from the velocity in α, a given value of the coefficients $c_{pore}$ and $c_{frac}$, and equations (3) and (7); and finally obtaining pressure gradients pressure gradients $g_{pore}$ and $g_{frac}$ by dividing the pore and fracture pressures by the depth to the middle of each layer. Given these pressure gradients, the predicted value of pore and fracture pressure can be computed at any depth by multiplying the gradient in the layer where the measurement was taken by the measurement depth, and a dimensionless misfit can be immediately calculated as the difference between the predicted pore or fracture pressure and the measured value divided by the standard deviation of the error expected in the measurement. The user will specify these standard deviations at the outset for each pressure measurement as a fraction of the measured value (typically a few percent).

The final value of the likelihood for the pore pressure data is $$f(d_{pore}|k, z, \alpha, \rho, c_{pore}) = exp[-\tfrac{1}{2}\Sigma misfit^2] \times \pi\tfrac{1}{2}[1+erf(misfit)], \quad (22)$$

where the pore pressure data are divided in two sets: the misfits from pore pressure measurements are entered in the summation X misfit, while the misfits from mud weight data enter in the product $\pi\tfrac{1}{2}[1+erf(misfit)]$. The latter form of the likelihood accounts for the fact that the mud weights only provide an upper bound for the pore pressure: each term in the product tends to zero if the predicted pore pressure exceeds the mud weight by an amount that is large compared to the expected error in the mud weight value, and tends to one if the predicted pore pressure is less than the mud weight by an amount that is large compared to the expected error in the mud weight value. The likelihood for the fracture pressure data is simply $$f(d_{frac}|k, z, \alpha, \rho, c_{pore}, c_{frac}) = exp[-\tfrac{1}{2}\Sigma misfit^2]. \quad (23)$$

For sampling, it is useful to define the joint likelihood for all the data. As it is typically assumed that the measurement errors are independent, the joint likelihood is simply the product of the two likelihoods in equations (22) and (23):

$$f(d_{pore}, d_{frac}|k, z, \alpha, \rho, c_{pore}, c_{frac}) =$$

$$f(d_{pore}|k, z, \alpha, \rho, c_{pore}) \times f(d_{frac}|k, z, \alpha, \rho, c_{pore}, c_{frac}). \quad (24)$$

According to the invention, and as previously indicated, a practical way to quantify the uncertainty of $p_{pore}(z)$ and $p_{frac}(z)$ is to sample their posterior PDFs given all the data with a Monte Carlo method. In other words, a large number N of possible profiles of pore and fracture pressures may be obtained whose distribution approximates the posterior PDFs more and more closely as N increases. Following the decomposition of the posterior PDF for all the uncertain inputs of equation (10), values from each of the conditional PDFs on the right-hand side of (10) are sampled sequentially and the corresponding values of the pore and fracture pressures are computed. Each iteration in the Monte Carlo sampling loop follows these steps:

(1) Sample values for $a^*(z)$ from $f(\alpha(z)|d_\alpha)$;
(2) Sample values for $\rho^*(z)$ from $f(\rho(z)|\alpha(z), d_\rho)$;
(3) Compute overburden pressure profile $p^*_{over}(z)$ by integrating the density profile $\rho^*(z)$;
(4) Sample a value $c^*_{pore}$ from $f(c_{pore}|\alpha^*(z), \rho^*(z), d_{pore})$ and compute a pore pressure profile $\rho^*_{pore}(z)$ from equation (3);
(5) Sample a value $c^*_{frac}$ from $f(c_{frac}|\alpha^*(z), \rho^*(z), c^*_{pore}, d_{frac})$ and compute a fracture pressure profile $\rho^*_{frac}(z)$ from equation (5).

This process is effectively the same as in the deterministic method outlined above in the "State of the Art", but applied to a case where the inputs to equations (3) and (7) are not fixed, but rather have probability distributions that define their uncertainties. By repeating the Monte Carlo sampling loop steps (1)–(5) listed above N times, N sampled values of the pore and fracturing pressures $p^*_{pore}(z)$ and $p^*_{frac}$ are generated. Each of these sampled values defines a different mud weight window, and by superimposing a large enough number N of these possible mud weight windows, the uncertainty in the predicted mud weight window is immediately obtained. If the data are informative, these possible mud weight windows will all be relatively similar, and there will be a small uncertainty. If the data provide only weak constraints, there will be a large variation in the possible mud weight windows, and the uncertainty in the predicted mud weight window will be large.

For the two sampling tasks of the Monte Carlo sampling loop, Markov Chain Monte Carlo sampling algorithms are preferably utilized (see, Gilks, W. R., Richardson, S., and Spiegelhalter, D. J., *Markov Chain Monte Carlo in Practice*, Chapman and Hall, London, 1996, for a general reference on these algorithms). The key feature of these algorithms is that they follow a random walk in the space of the parameters to be sampled (in the present case, velocity and density profiles and coefficients $c^*_{pore}$ and $c^*_{frac}$). The algorithm computes a proposed step in parameter space by perturbing the current value of the parameters. This step is accepted or rejected depending on the value of the posterior PDF of the perturbed parameters. For an appropriate definition of the probability of accepting the proposed step, it can be shown that this simple algorithm will asymptotically sample the posterior PDF of the parameters.

While the Monte Carlo sampling loop set forth above deals with continuous profiles of velocity $\alpha(z)$, density $\rho(z)$, and pressures $\rho_{over}(z)$, $p_{pore}(z)$, and $p_{frac}(z)$, in practice, as noted earlier, these profiles may be represented by a layered model with a finite number of layers. The values of velocity, density and of the pressure gradients are assumed to be constant within each layer; the number of layers and the depths of the layer interfaces are not fixed a priori, but are variable and are determined by the sampling algorithms to fit the data.

It is convenient to break the Monte Carlo sampling process steps described above into two sampling stages. The first sampling algorithm generates a large sample (say, several thousand) of layered models with velocities that agree with the prior information and fits the velocity data in $d_\alpha$ and density data in $d_\alpha$ (steps 1 and 2 above); the second algorithm takes as input the layered models output by the first, samples the posterior distribution of the coefficients $c^*_{pore}$ and $c_{frac}$ that agree with the pressure data in $d_{pore}$ and $d_{frac}$ and compute a corresponding sample of pore and fracture pressure gradients (steps 3–5 above). Both these algorithms will run in absence of the velocity, density, or pressure data, and they will sample the prior, pre-drilling distribution in that case.

For purposes of completeness, details of the Markov Chain Monte Carlo algorithm for generating velocity and density profiles is as follows, starting from an arbitrary initial layered model with $k^*$ layers, depths to interfaces in $z^*$, and a marginal likelihood $L^* = f(d_\alpha|k^*, z^*)$ computed from equation (20);

a. Obtain a candidate number of layers $k^*_{cand}$ and depths to interfaces $z^*_{cand}$ for the proposed step by randomly perturbing the current number of layers $k^*$ and depths to interfaces $z^*$; this is done by adding an interface at a depth chosen at random, deleting an interface chosen at random, or changing the depth of an interface chosen at random;
b. Compute the marginal likelihood of this candidate $L^*_{cand} = f(d_\alpha|k^*_{cand}, Z^*_{cand})$ from equation (20);
c. Generate a random number r with a uniform distribution between 0 and 1; if $r<[L^*_{cand}|L^*]$, set $k^*=k^*_{cand}$ and $z^*=Z^*_{cand}$; otherwise, leave $k^*$ and $z^*$ unchanged;
d. Sample a velocity vector us from the multivariate normal posterior PDF of the slownesses $f(u|k^*, z^*, d_\alpha)$ in equation (17); compute the corresponding velocity vector $\alpha^*$;

e. Sample a density vector $\rho^*$ from the multivariate normal posterior PDF of density $f(\rho|k^*, z^*, \alpha^*, d_\rho)$ in equation (21);

f. Output the sampled layered model $(k^*, z^*, \alpha^*, \rho^*)$;

g. Go to step a.

Sampling multivariate normal distributions as in steps (d) and (e) above can be done with the method described by Rubinstein, R. Y., "Simulation and the Monte Carlo Method", John Wiley and Sons, New York, 1981. As suggested above, it can be shown that this algorithm will asymptotically sample the posterior PDF of velocities and the posterior PDF of the densities in the layered model. In practice, there will be an initial "burn-in" phase where the sampling converges to the high posterior probability region. The end of this initial convergence can be easily detected by monitoring how well each sampled layered model fits the data; the burn-in phase ends when the data are fitted within the expected error. Typically, the burn-in takes only a few tens of iterations, and a few thousand layered models are enough to characterize the uncertainty in velocity and density. If there are no data available, the likelihood in equation (15) will be a constant and the posterior PDF of the slownesses in equation (17) will equal the prior PDF, so that the algorithm will sample the prior PDF of velocity, as expected. Finally, an interesting feature of this method is that it will sample layered models that have enough layers to account for the prior information and fit the data, but not too many. See Malinverno, A. and Leaney, W. S. "A Monte Carlo method to quantify uncertainty in the inversion of zero-offset VSP data, paper presented at the 70th Annual International SEG Meeting, Expanded Abstracts, *Society of Exploration Geophysicists*, Calgary, (2000).

For purposes of further completeness, the Markov Chain Monte Carlo algorithm for generating pore and fracture pressure profiles is as follows. It is noted that the sampling process is similar to that of the process used for velocity and density, and takes as its input the sample of layered models consistent with the velocity and density data. The starting point is an initial layered model $(k^*, z^*, \alpha^*, \rho^*)$ that is the first layered model sampled from the posterior PDF by the algorithm described with respect to velocity and density. An initial value is then sampled for $c^*_{pore}$ and $c^*_{frac}$, and the pressure gradients $g^*_{pore}$ and $g^*_{frac}$ and the likelihood function $L^* = f(d_{pore}, d_{frac} | k^*, z^*, \alpha^*, \rho^*, c^*_{pore}, c^*_{frac})$ are computed as in equation (24). Sampling then follows this loop:

a. Read a candidate layered model $(k^*_{cand}, z^*_{cand}, \alpha^*_{cand}, \rho^*_{cand})$ sampled from the posterior PDF by the velocity and density Markov Chain Monte Carlo algorithm described above;

b. Perturb current $c^*_{pore}$ and $c^*_{frac}$ and obtain candidate values $c^*_{pore\ cand}$ and $c^*_{frac\ cand}$; this is done by adding a small random amount to the current values while keeping the coefficients within the minimum and maximum prescribed by the prior PDF;

c. Compute the pressure gradients $g^*_{port\ cand}$ and $g^*_{frac\ cand}$ and the likelihood function $L^*_{cand} = f(d_{pore}, d_{frac} | k^*_{cand}, z^*_{cand}, \alpha^*_{cand}, \rho^*_{cand}, c^*_{pore\ cand}, c^*_{frac\ cand})$ of the candidate as in equation (24);

d. Generate a random number r with a uniform distribution between 0 and 1; if $r < [L^*_{cand}/L^*]$, set $k^* = k^*_{cand}$, $z^* = z^*_{cand}$, $\alpha^* = \alpha^*_{cand}$, $\rho^* = \rho^*_{cand}$, $c^*_{pore} = c^*_{pore\ cand}$, $c^*_{frac} = c^*_{frac\ cand}$, $g^*_{port} = g^*_{port\ cand}$, and $g^*_{frac} = g^*_{frac\ cand}$; otherwise, leave $k^*, z^*, \alpha^*, \rho^*, c^*_{pore}, c^*_{frac}, g^*_{pore}$, and $g^*_{frac}$ unchanged;

e. Output current layered model $(k^*, z^*, \alpha^*, \rho^*, g^*_{pore}, g^*_{frac})$;

f. Go to step a.

As with the Markov Chain Monte Carlo algorithm for the density and velocity, it can be shown that this algorithm will asymptotically sample the posterior PDF of the coefficients $c^*_{pore}$ and $c^*_{frac}$ given the pressure data $d^*_{pore}$ and $d^*_{frac}$. Again, there will be an initial "burn-in" phase where the sampling converges to the high posterior probability region, and the end of this initial convergence phase can be detected by monitoring how well each sampled layered model fits the pressure data. If there are no pressure data available, the likelihood in equation (24) will be a constant and that the algorithm will sample the prior PDF of the coefficients $c^*_{pore}$ and $c^*_{frac}$, as expected.

EXAMPLE

In the following example the methods and apparatus of the invention have been applied to predict a mud weight window. In the example, the predicted velocity and density profiles and mud weight window are shown with uncertainties at three stages: before drilling, during drilling with checkshot data only, and during drilling with checkshot and pressure data.

The well of this example was drilled at a water depth of 105 m in a basin with undercompacted, overpressured shales, and a VSP was shot to investigate the velocity structure. The inputs to the mud weight prediction were as follows:

(1) Prior PDF of Compressional Wave Velocity:

This prior PDF should be constructed on the basis of relatively low-resolution surface seismic information. Access to surface seismic data was not available in this case, and for the purpose of testing a low-resolution version of the velocities that can be deduced from the checkshot data was taken as a best estimate of velocity. The depth-velocity pairs that define the prior mean of velocity indicate a low in seismic velocity at a depth of about 3000 m and are

| Depth (m) | Velocity (m/s) |
|---|---|
| 105 | 1600 |
| 2500 | 3396 |
| 2750 | 2900 |
| 3000 | 2771 |
| 3400 | 3200 |
| 3800 | 4371 |
| 4000 | 4521 |

The prior standard deviation of velocity was set to 10% of the prior mean.

(2) Prior Distribution of Coefficients:

For the coefficients that enter Gardner's law (equation 4) and the pore and fracture pressure relationships (equations 3 and 7) the following prior values were utilized:

| Parameter | | Minimum | Maximum | Units |
|---|---|---|---|---|
| $c_{pore}$ | $a_0$ | 1500 | 1700 | m/s |
| | $b_a$ | 0.6 | 0.9 | 1/s |
| | n | 2.5 | 5.5 | — |
| $c_{frac}$ | $k_\infty$ | | 1 | — |
| | $k_0$ | 0.3 | 0.5 | — |
| | $b_k$ | 2000 | 6000 | psi |

The coefficient $k_\infty$ is assumed to be fixed (e.g., equal to 1) while the others are assumed to have a prior PDF that is uniform between a minimum and a maximum value. The prior ranges of the coefficients $\alpha_0$ and $b_\alpha$, in $c_{pore}$ span the velocity trends for normally pressured sediments in this case, and the exponent n covers a broad range of possible values that should also include overpressures due to causes other than undercompaction as set forth in previously cited Bowers, 1995. Finally, the prior ranges of the coefficients $k_0$ and $b_k$ in $c_{frac}$ span the range of values reported in published studies such as in previously cited Zamora, 1989. Density was predicted from velocity using Gardner's law; the coefficients used were A =370, B=0.23 and $\Delta\rho$=0.02, and were obtained from a cross-plot of log measurements of velocity and density.

(3) Checkshot Data:

For FIGS. 5a–5c described below, 97 travel time-depth pairs in the depth interval 560–2485 m were used. The picked travel times were all assigned a standard deviation of 1 ms.

(4) Pressure Data:

For FIGS. 6a–6c, previous information about two mud weight values for this well were utilized: 9.8 lb/gal at 1800 m depth and 12.2 lb/gal at 2400 m depth. For the purposes of testing, two fictional fracture pressures were utilized: 4800 psi at 1800 m depth and 6800 psi at 2400 m depth. All these pressure measurements were assigned a standard deviation equal to 5% of the measured value.

Figure 2:
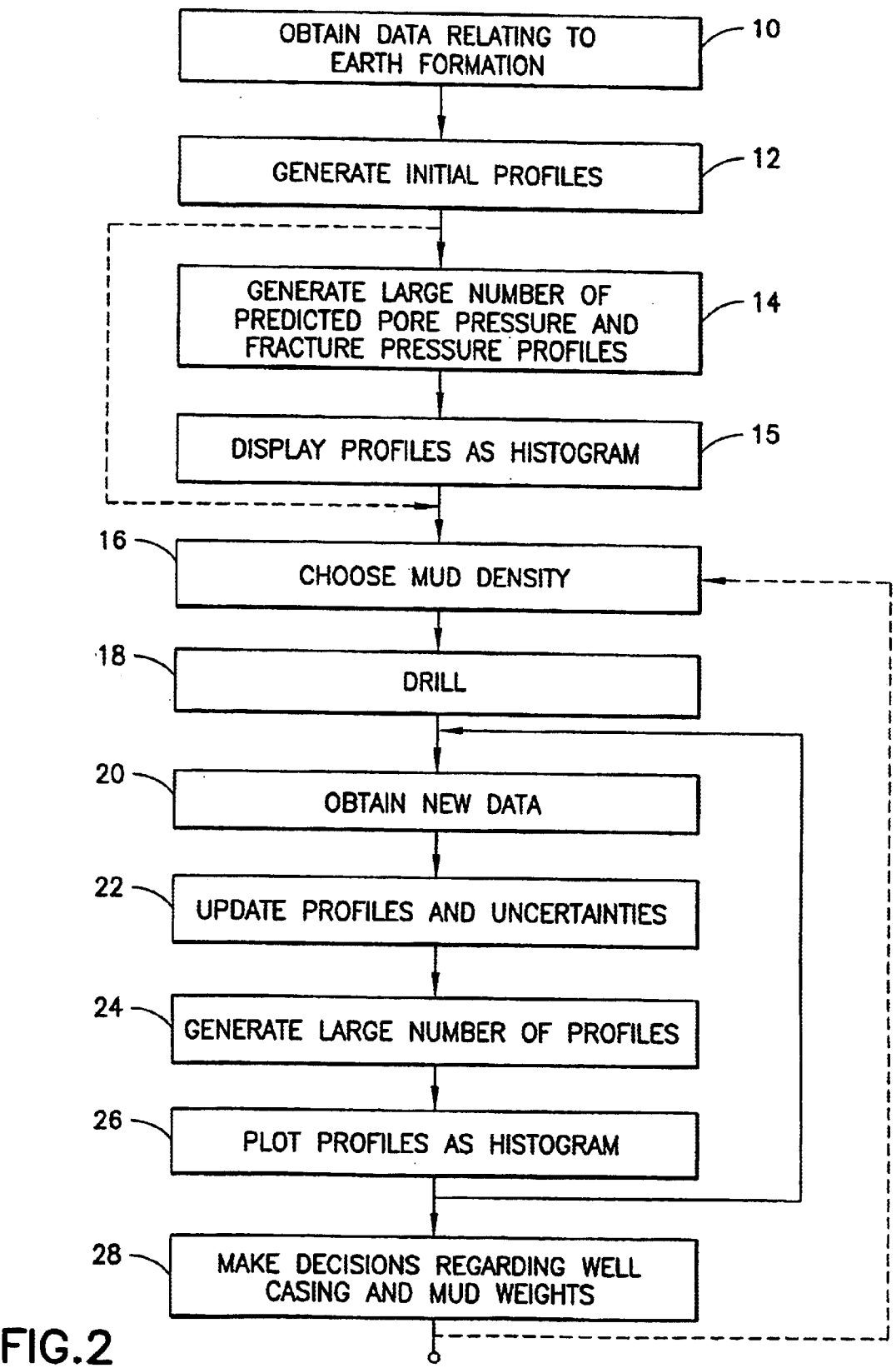
FIG. 2 is a plot of density versus compressional wave velocities for well log data with a line indicating a best-fitted Gardner's law relationship.

Turning now to FIGS. 4a–4c, the results are shown of running the Monte Carlo sampling before drilling (as suggested at step 14 of FIG. 2); that, is, using no checkshot data and no pressure data. FIG. 4a shows the uncertainty in compressional wave velocity with depth. This image is a histogram constructed by superimposing all the layered media sampled by the Monte Carlo algorithm. Darker areas correspond to areas of higher probability, and lighter areas to lower probabilities. The three lines mark the 5%, 50%, and 95% quantiles; in other words, there is a 90% probability that the P-velocity is within the left and the right line. The velocity follows the trend specified by the prior mean and prior standard deviation (10% of the prior mean velocity value). FIG. 4b shows the uncertainty in density with depth. Again, the three lines mark the 5%, 50%, and 95% quantiles. FIG. 4c shows the uncertainty in the predicted mud weight window. This image is a histogram constructed by superimposing all the mud weight windows sampled by the Monte Carlo algorithm. Darker areas between the lighter-pore pressure gradient and fracture pressure gradient areas correspond to a mud weight interval that was covered by all the sampled mud weight windows, while no mud weight window was sampled in the darker areas outside these lighter gradient areas. In other words, the darker areas between these gradient areas mark "safe" values of mud weight and the darker areas outside these gradient areas should be well below the pore pressure gradient (on the left) or well above the fracture pressure gradient (on the right). The width of the lighter gradient areas shows the uncertainty in the pore pressure gradient (on the left) and the facture gradient (on the right). The main feature of interest is the high pore pressure at a depth of about 3000 m, where the uncertainties in pore and fracture pressure are large enough so that there is no clear safe mud weight window.

FIGS. 5a–5c show the results of running the Monte Carlo sampling using the checkshot data measured between 560–2485 m. This ideally represents a while-drilling case, where drilling has reached about 2500 m depth and the checkshot data were acquired while drilling by seismic MWD. Compared to the pre-drilling case (FIGS. 4a–4c), the uncertainty in velocity is markedly reduced in the depth interval spanned by the checkshot data, which results in an improved definition of the mud weight window.

FIGS. 6a–6c show the results of running the Monte Carlo sampling using the checkshot data measured between 560–2485 m and the well pressure data (two mud weights and two fracture pressures, shown as white triangles and rectangles, respectively). The mud weight window has been calibrated by the well pressure data, and the narrow mud weight window at a depth of about 3000 m has broadened compared to the pre-drilling case (FIGS. 4a–4c), indicating now a safe mud weight of 16–17 lb/gal. As drilling continues below 2500 m depth and additional checkshot data become available, the Monte Carlo sampling process can be repeated with all the available data and the uncertainty in the predicted mud weight window can be reevaluated.

Figure 7:
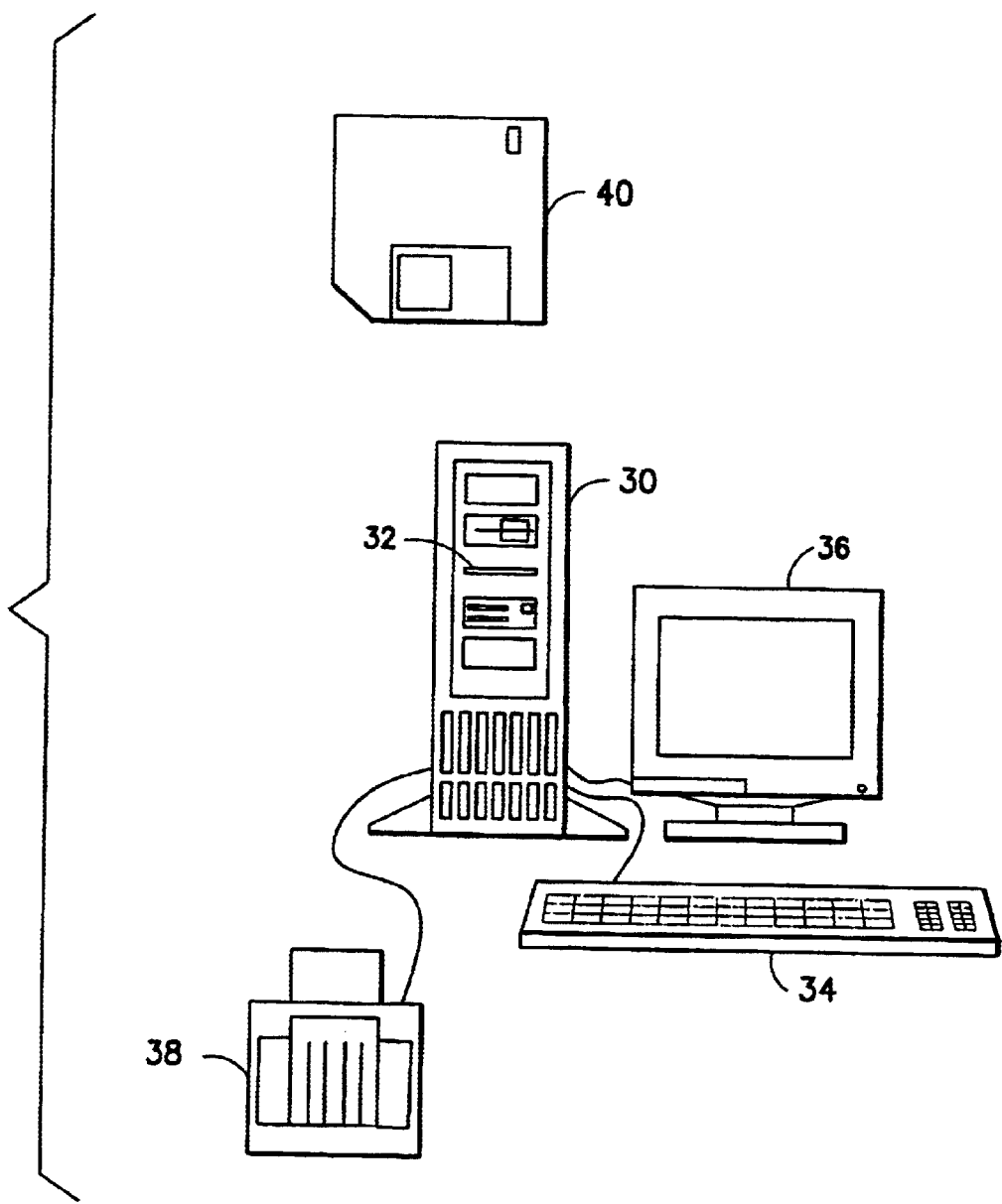
FIG. 7 is a schematic illustration of computer hardware capable of implementing the methods of the invention.

It will be appreciated by those skilled in the art that the methods of the invention are implemented by a combination of hardware and software. A typical apparatus for such implementation is seen in FIG. 7 where a computer 30 is shown typically including a hard drive (not shown) and having a media reading device, such as a disk drive reader 32. The media reading device may also be capable of recording an output of the program the computer 30 is running. A user of the computer 30 may enter commands using a user input device, such as a keyboard 34 or a mouse (not shown), may view output of the computer on a visual display device such as a monitor 36, and may make hard copies of computer outputs using an output device such as a printer 38. When properly configured, the computer 30 and its associated peripheral devices constitute an apparatus for implementing the method of the present invention. Computer media, such as diskette 40, a CD-ROM or a ZIP disk (not shown) may include computer readable program code that allows the computer to generate on the monitor 36 or as a print-out via printer 38 histograms such as those shown in FIGS. 4a–4c, 5a–5c, and 6a–6c. From the histograms, determinations may be made as to how to case a borehole being drilled in a formation and what mud weights to use at what depths in the formation.

There has been described and illustrated herein methods and apparatus for predicting pore and fracture pressures of a subsurface formation. While particular embodiments of the invention have been described, it is not intended that the invention be limited thereto, as it is intended that the invention be as broad in scope as the art will allow and that the specification be read likewise. Thus, while the invention was described with reference to generating pore and fracture pressure profiles in order to find mud weight windows for purposes of casing analysis, it will be appreciated that the invention could be utilized to generate profiles of other formation characteristics which could be useful for other purposes such as predicting the stability of the wellbore. Also, while the invention was described with reference to widely used empirical formulas relating pore and fracture pressures to compressional wave velocities, it should be appreciated that other formulas could be utilized, and/or other types of data relating to pore and fracture pressures could be utilized where the other types of data have known or ascertainable associated uncertainties. Further, while the invention was described with reference to the use of VSP, checkshot, well log, and pressure measurements acquired while drilling, it will be appreciated that other measurements acquired while drilling relating to pore and fracture pressures could be utilized. In addition, while the invention was described with regard to using a Markov Chain Monte Carlo algorithm which uses a Bayesian formulation for generating numerous profiles which can be viewed as a histogram, it will be appreciated that other algorithms that define directly posterior PDFs of interest or use other types of Monte Carlo sampling and that account for assigned uncertainties can be utilized. It will therefore be appreciated by those skilled in the art that yet other modifications could be made to the provided invention without deviating from its spirit and scope as claimed.

| Symbol | Definition |
|---|---|
| A | Gardner's law multiplicative coefficient |
| B | Gardner's law exponent |
| $b_a$ | Gradient in normal trend of compressional wave velocity |
| $b_k$ | Decay constant in effective stress ratio relationship |
| $c_{frac}$ | Vector of coefficients in fracture pressure relationship |
| $c_{pore}$ | Vector of coefficients in pore pressure relationship |
| $d_a$ | Vector of measurements related to compressional wave velocity |
| $d_p$ | Vector of measurements related to density |
| $d_{pore}$ | Vector of measurements related to pore pressure |
| $d_{frac}$ | Vector of measurements related to fracture pressure |
| f(x) | Probability density function of variable x |
| f(x\|y) | Probability density function of variable x given y |
| g | Gravitational acceleration |
| k(z) | Effective stress ratio at depth z |
| $k_0$ | Effective stress ratio at the mudline |
| $k_\infty$ | Asymptotic effective stress ratio as z goes to infinity |
| n | Exponent in pore pressure relationship |
| $p_{frac}(z)$ | Fracture pressure at depth z |
| $p_{over}(z)$ | Overburden pressure at depth z |
| $p_{norm}(z)$ | Normal (hydrostatic) pore pressure at depth z |
| $p_{pore}(z)$ | Pore pressure at depth z |
| z | Depth |
| $z_0$ | Depth of the mudline |
| $\alpha(z)$ | Compressional wave velocity at depth z |
| $\alpha_{norm}(z)$ | Normal trend of compressional wave velocity at depth z |
| $\alpha_0$ | Compressional wave velocity at the mudline |
| $\Delta_\rho$ | Residual standard deviation of density predicted by Gardner's law |
| $\rho_w$ | Density of water |
| $\rho(z)$ | Bulk density at depth z |
| $\sigma_h(z)$ | Minimum horizontal effective stress at depth z |
| $\sigma_v(z)$ | Vertical effective stress at depth z |

What is claimed is:

1. A method of generating information regarding formation parameters as a function of depth, comprising:

a) generating an initial prediction of a profile of the formation parameters and uncertainties associated with the initial prediction using information available regarding the formation;

b) obtaining information related to the formation parameters during drilling of the formation;

c) updating the uncertainties as a function of said initial prediction and the information obtained during drilling of the formation; and d) using updated uncertainties and said initial prediction, generating numerous profiles of the formation parameters consistent with said updated uncertainties.

2. A method according to claim 1, further comprising:

e) displaying an indication of said numerous profiles.

3. A method according to claim 1, wherein:

said obtaining, updating and generating are repeated in a recursive fashion.

4. A method according to claim 1, wherein:

said updating is accomplished using a Bayesian analysis.

5. A method according to claim 4, wherein:

said generating is accomplished using a random value generation technique.

6. A method according to claim 5, wherein:

said random value generation technique is a Markov Chain Monte Carlo technique.

7. A method according to claim 1, wherein:

said formation parameters include pore pressure and fracture pressure.

8. A method according to claim 7, wherein:

said formation parameters further include compressional velocity and density.

9. A method according to claim 7, wherein:

said information related to the formation parameters comprises at least one of checkshot data, sonic log data, and VSP data.

10. A method according to claim 9, wherein:

said information related to the formation parameters comprises at least one of borehole pressure information and mud weight information.

11. A method according to claim 2, wherein:

said displaying comprises generating and displaying a probabilistic representation of said profiles of said formation parameters.

12. A method according to claim 11, wherein:

said probabilistic representation comprises a histogram.

13. A method according to claim 1, wherein:

said generating numerous profiles comprises generating at least one hundred profiles.

14. A method according to claim 1, wherein:

said information available regarding the formation includes information regarding compressional wave velocity of the formation and density of the formation, both as a function of formation depth.

15. An apparatus for generating information regarding a subsurface formation, comprising:

a) means for storing information regarding formation parameters;

b) means for generating an initial prediction of a profile of the formation parameters and uncertainties associated with the initial prediction from said information stored on said means for storing;

c) means for obtaining information related to the formation parameters during drilling of the formation;

d) means for updating the uncertainties as a function of said initial prediction and the information obtained during drilling of the formation; and e) means for generating numerous profiles of the formation parameters consistent with said updated uncertainties.

16. An apparatus according to claim 15, further comprising:

f) means for displaying an indication of said numerous profiles.

17. An apparatus according to claim 15, wherein:

said means for updating includes means for conducting a Bayesian analysis.

18. An apparatus according to claim 15, wherein:

said means for generating includes means for generating random values.

19. An apparatus according to claim 18, wherein:

said means for generating random values implements a Markov Chain Monte Carlo technique.

20. An apparatus according to claim 15, wherein:

said formation parameters include pore pressure and fracture pressure.

21. An apparatus according to claim 20, wherein:

said formation parameters further include compressional velocity and density.

22. An apparatus according to claim 20, wherein:
said information related to the formation parameters comprises at least one of checkshot data, sonic log data, and VSP data.

23. An apparatus according to claim 22, wherein:
said information related to the formation parameters comprises at least one of borehole pressure information and mud weight information.

24. An apparatus according to claim 16, wherein:
said means for displaying comprises at least one of a monitor and a printer.

25. An apparatus according to claim 24, wherein:
said indication of said numerous profiles comprises a histogram.

26. An apparatus according to claim 15, wherein:
said numerous profiles comprises at least one hundred profiles.

27. A method for making a decision related to the drilling of a hole in a formation, comprising:
a) generating an initial prediction of a profile of parameters of the formation and uncertainties associated with the initial prediction using information available regarding the formation;
b) obtaining information related to the formation parameters during drilling of the formation;
c) updating the uncertainties as a function of said initial prediction and the information obtained during drilling of the formation;
d) using updated uncertainties and said initial prediction, generating numerous profiles of the formation parameters consistent with said updated uncertainties; and
e) making a decision related to the drilling of the hole in the formation based on said numerous profiles.

28. A method according to claim 27, further comprising:
f) displaying an indication of said numerous profiles as a log, wherein said log is utilized in said making a decision.

29. A method according to claim 27, wherein:
said obtaining, updating, generating, and making a decision are repeated in a recursive fashion.

30. A method according to claim 29, wherein:
said updating is accomplished using a Bayesian analysis.

31. A method according to claim 30, wherein:
said generating is accomplished using a random value generation technique.

32. A method according to claim 31, wherein:
said random value generation technique is a Markov Chain Monte Carlo technique.

33. A method according to claim 27, wherein:
said formation parameters include pore pressure and fracture pressure.

34. A method according to claim 33, wherein:
said formation parameters further include compressional velocity and density.

35. A method according to claim 33, wherein:
said information related to the formation parameters comprises at least one of checkshot data, sonic log data, and VSP data.

36. A method according to claim 33, wherein:
said information related to the formation parameters comprises at least one of borehole pressure information and mud weight information.

37. A method according to claim 36, wherein:
said decision is a determination of a mud weight to be used in further drilling of the formation.

38. A method according to claim 36, wherein:
said decision further includes a well casing determination.

39. A method according to claim 28, wherein:
said displaying comprises generating and displaying a probabilistic representation of said profiles of said formation parameters.

40. A method according to claim 39, wherein:
said probabilistic representation comprises a histogram.

* * * * *